Nov. 7, 1972    R. D. RUMSEY    3,702,202
ENERGY STORING ABSORBING BUMPER SUPPORT SYSTEMS
Filed April 30, 1970    7 Sheets-Sheet 1

INVENTOR.
Rollin Douglas Rumsey
BY Hill, Sherman, Meroni, Gross & Simpson
ATTORNEYS

INVENTOR.
Rollin Douglas Rumsey

Nov. 7, 1972  R. D. RUMSEY  3,702,202
ENERGY STORING ABSORBING BUMPER SUPPORT SYSTEMS
Filed April 30, 1970  7 Sheets-Sheet 5

Fig.13
Fig.14
Fig.15

INVENTOR.
Rollin Douglas Rumsey
BY Hill, Sherman, Meroni, Gross & Simpson
ATTORNEYS United States Patent Office 3,702,202
Patented Nov. 7, 1972

3,702,202
ENERGY STORING/ABSORBING BUMPER
SUPPORT SYSTEMS
Rollin Douglas Rumsey, Buffalo, N.Y., assignor to
Houdaille Industries Inc., Buffalo, N.Y.
Filed Apr. 30, 1970, Ser. No. 33,260
Int. Cl. B60r 19/08; F16f 7/00
U.S. Cl. 293—89
44 Claims

ABSTRACT OF THE DISCLOSURE

Buckling columns, i.e. steel bars having stiff spring resiliency, provide bumper support enabling returnable yielding of the bumper after at least a predetermined maximum impact pressure thereagainst. In an automobile bumper a safe impact load provision of five miles per hour for a four thousand pound vehicle permitting about two inch deflection under pressure will eliminate a substantial amount of potential damage to an automobile bumper. Excessive rebound energy may be damped by inserting friction buffing and damping into the system.

---

The present invention relates generally to energy storing/absorbing bumper support systems and is more particularly concerned with the mounting of automobile bumpers in a manner to protect the same against damage from at least the numerous minor collisions to which such bumpers are subject in the running of the associated vehicles.

Any moving object develops a certain kinetic energy level proportional to its speed or velocity squared. When the moving object impacts against another moving object or a non-moving object, this kinetic energy must be dissipated and this may occur by deformation of structure or by being stored or absorbed as, for example, in a bumper system.

Relating the foregoing specifically to automotive vehicles, and more particularly to automobiles, excessive damage has been experienced in respect to present-day bumpers which have, to a large extent, become mainly decorative trim for the vehicles. Further, it is generally known that in the auto industry the designers are extremely reluctant to sacrifice any styling potentialities, and it is therefore impractical to return to the rugged spring bumper of an earlier day when the bumpers themselves were constructed to absorb rather significant impacts without damage either to the bumpers or to the associated vehicle structure. For styling reasons present-day bumpers are generally of as large as practicable area and may even carry as integral parts of the bumper structure additional trim such as that framing the popular projecting nose design, and the like. Accordingly, present-day bumpers, for reasons of economy, are generally constructed of relatively soft steel virtually lacking in spring characteristics and which is liable to be dented and cracked under rather low impact, and particularly impacts occurring up to about five miles per hour, where the bumpers are mounted in an essentially fixed or rigid manner relative to the vehicle frame. In order to alleviate the bumper damage situation, various expedients have heretofore been proposed, such as constructing the bumpers of a fluid filled structure, constructing the bumpers of or equipping them with rubber cushions, but those expedients detract from designer latitude and thus are not readily adopted. The use of coiled springs or rubber cushions behind the bumpers has been proposed, but those expedients insert a snapping recoil factor into the bumper system which accentuates backlash. It has also been proposed to provide collapsibly yieldable structure in the bumper system, but that requires replacement of the system or parts of the system or a physical resetting after impact. Highly efficient forms of hydraulic buffers or dampers have been proposed, but the added cost is prohibitive as original equipment in medium and low priced automobiles, and automobile owners resist the expenditure where offered as optional equipment.

In the meanwhile, collision insurance rates have necessarily escalated because of the ever-increasing volume and size of damage claims, a significant proportion of which result from relatively minor collisions where the vehicle is moving at no more than about five miles per hour, such as in parking lot start-ups and congested traffic incidents. The situation has become so serious from an insurance claim standpoint that recently a major insurance company has indicated a willingness to reduce collision premium rates by as much as twenty percent on automobiles which can take five mile per hour front or rear end bumper impact without damage and other insurance companies are expected to follow the trend.

According to the present invention, the foregoing and other deficiencies, defects, inefficiencies, shortcomings and problems are overcome by providing new and improved energy storing/absorbing bumper support systems which will meet at least the minimum requirement for automobile bumpers to enable absorption of at least five miles per hour collision force without damage.

An important object of the present invention is to provide a new and improved energy storing/absorbing bumper support system which can be produced and installed at low cost and without extensive modification of bumper or vehicle structure from current designs.

Another object of the invention is to provide a new and improved energy storing/absorbing bumper support system for automobiles adapted to be installed without requiring any extensive modifications from conventional practice.

A further object of the invention is to provide a new and improved energy storing/absorbing bumper support system which can be produced at low cost and will add only nominal cost over conventional structure of bumper supports.

Still another object of the invention is to provide a new and improved bumper support structure which will satisfactorily absorb impacts thereagainst which would be damaging in the absence of this support and which will efficiently store impact energy to operate after such impacts to return to a normal position.

Yet another object of the invention is to provide a new and improved energy storing/absorbing bumper support system which is highly efficient within a limited range of yielding movement.

A still further object of the invention is to provide a new and improved energy storing/absorbing bumper support system which is highly adaptable to meet numerous and varied design and structural configurations and arrangements.

A yet further object of the invention is to provide a new and improved energy storing/absorbing bumper support system which may rely entirely upon buckling columns or a combination of buckling columns and friction buffing to attain the desired results.

Other objects, features and advantages of the invention will be readily apparent from the following description of certain preferred embodiments thereof, taken in conjunction with accompanying drawings, although variations and modifications may be effected without departing from the spirit and scope of the novel concepts embodied in the disclosure, and in which:

Figure 1:
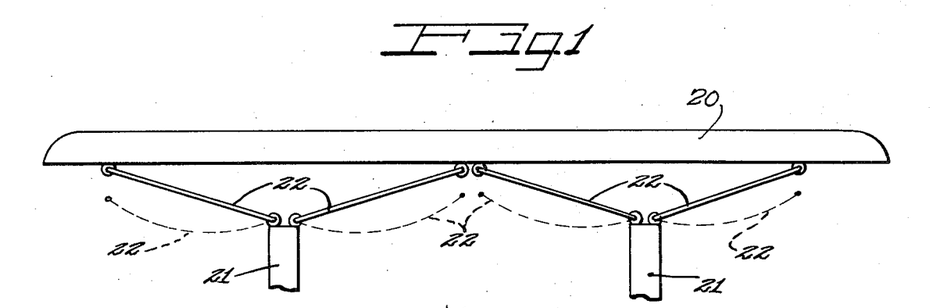
FIG. 1 is a schematic plan view of an energy storing/absorbing bumper support system embodying features of the invention.

By way of illustration, the invention will be described herein primarily as related to automotive vehicle bumpers, but it will be appreciated that the principles of the invention are applicable to bumpers for other specific uses, such as in guard rails which are actually a type of bumper, marine bumpers either vessel-carried or dock-carried, and the like. To this end, there is shown in FIG. 1 one representative form of automotive vehicle bumper 20, either front or rear, supported normally spaced outwardly from relatively rigid structure at opposite side portions of an end of the vehicle, such as on the ends of longitudinal spaced body frame bars 21 by means of buckling column spring bars 22. In this instance, each of the buckling column bars 22 may be identical, there being a pair of the column bars 22 extending in splayed relation from each of the frame bars 21 to and attached to the bumper 20. Desirably, the ends of the column bars 22 are attached pivotally to the respective members and in fixed locations thereon in a manner to receive endwise compressive forces. A principal consideration is the attainment of a strongly resilient buckling column energy storing/absorbing bar support system that attains a high resistance level initially and maintains that resistance relatively constant throughout the available bumper support system travel stroke. In an automobile bumper allowable travel without any substantial interference with the designer's latitude is about two and one-half inches. Upon pressure being applied to the bumper 20 relative to the vehicle frame, the buckling column spring bars 22 will buckle as indicated in dot-dash outline resiliently within their design parameters and when the pressure is relieved they will return to normal position, thereby returning the bumper to normal position. Although the column bars 22 are shown as deflectably bowed inwardly, they may be primed, as by means of slight initial curvature, to buckle outwardly, if preferred. In addition, the spring columns 22 may be slightly preloaded in deflected condition such that the preload deflection is on the order of .010 to .020 inch.

Material for the buckling column bars 22 is non-elastomeric material having a relatively high modulus of elasticity, and a relatively high yield point, both in the order of heat-treated steel, and having a high force to short travel distance in the buckling mode related to the weight of the vehicle such that impact of in the order of 5 m.p.h. against the bumper means can be tolerated without damage to the bumper means or the vehicle in a short displacement travel distance of the bumper means toward the rigid end structure of the vehicle, which distance is severely restricted by vehicle design and available space limitations between a normal position of the bumper means and said end structure; desirably spring steel material wherein the bars may be of about 5/16 by 3½ inch cross section and of suitable length for the particular installation for which intended. Hot formed rerolled rail steel such as SAE 1060 or 1080 material is satisfactory. In the heat treatment of the material to prevent embrittlement it should be austempered such as by heating the steel to 1425° F. to 1525° F. and quenching as rapidly as possible to not less than 400° F. A high speed high temperature quenching oil, low temperature salt, molten tin and possibly lead or zinc may be used for the purpose. Heat treatment should be such as to prevent formation of pearlite, but quenching should be stopped before the formation of martensite. Desirably the end structure should be bainite which has a high degree of toughness, high strength and excellent elongation characteristics. Excellent results can also be attained with alloy steels such as SAE 4340 with conventional heat treatment, but the cost of this material is substantially greater.

Figures 2, 3:
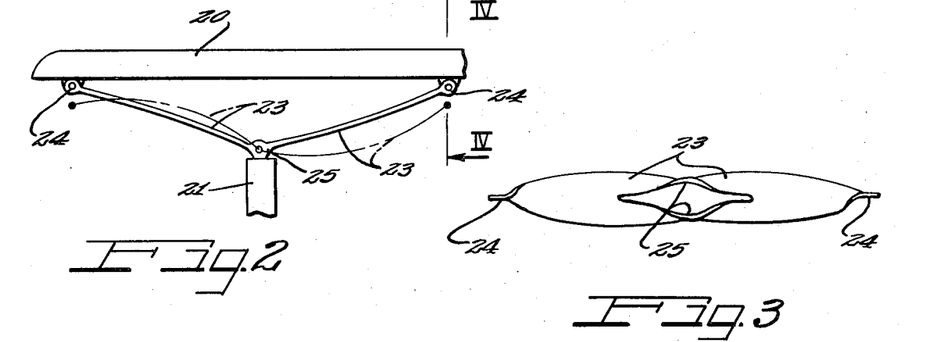
FIG. 2 is a schematic plan view of a modification.
FIG. 3 is an elevational view of a buckling column structure as employed in FIG. 2.

In FIGS. 2 and 3 is shown another desirable form of energy storing/absorbing bumper support system according to the present invention. Here the bumper 20 is supported on the frame bars 21 by means of a dual buckling column spring bar structure comprising a pair of diagonally outwardly splayed buckling columns 23 formed from a single piece of material, having respective distal end eye flange portions 24 by which means they are adapted to be attached pivotally to the bumper. At their proximal ends, the columns 23 are joined by means of aligned spaced coextensive turned attachment flanges 25 for pivotal attachment to the frame bar 21. In order to improve the buckling spring action of the columns 23 particularly to attain uniform stress loading, they are desirably of generally sinusoidally tapered width toward one or both opposite ends, and this may be true of all forms of especially the diagonally arranged buckling columns. As shown in FIG. 3, the material for the connecting flanges 25 is desirably derived from the inner portions of the inner ends of the bars 23 such that they are furcated. In addition, the respective bars may be slightly prebuckled or have a buckling bias, preferably one inwardly and the other one outwardly, whereby the prebuckle is accentuated and controls buckling movement during inward impact pressure deflection, as shown in dot-dash outline in FIG. 2. Strain is avoided on the flanges 25 by rocking about their vertical pivotal attachment to the frame bar 21.

Figure 4:
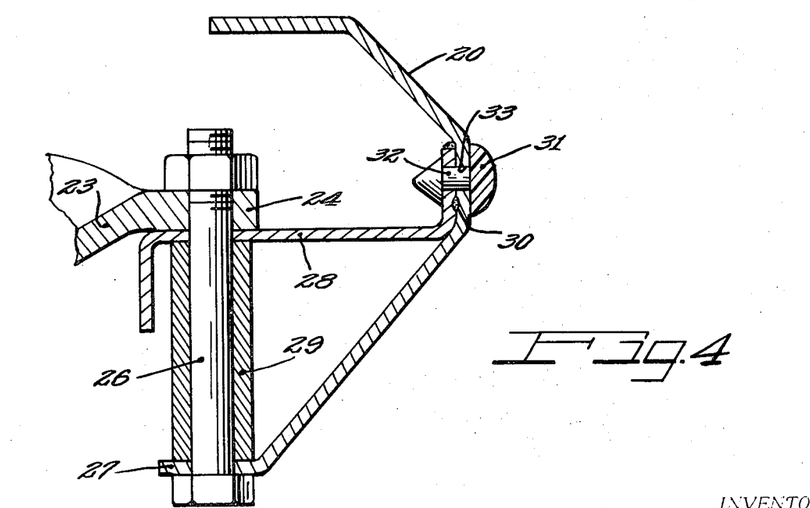
FIG. 4 is a fragmentary enlarged vertical sectional detail view taken substantially along the line IV—IV of FIG. 2.

As shown by way of example in FIG. 4, attachment of the terminal eyes 24 to the bumper 20 may be effected by means of respective bolts 26 secured through a marginal lower in-turned flange 27 of the bumper 20 and through an inwardly extending bracket 28, with a rigid bushing 29 about the bolt shank maintaining a positive spaced relation between the flange 27 and the bracket 28. Fixed attachment of the bracket 28 to the inner side of preferably the forwardmost or nose portion of the bump 20 is effected as by means of welding 30. Efficient impact thrust transmission through the bracket 28 to the buckling column is attained by having the bracket extending rearwardly in generally horizontal plane and having the eye flange 24 resting thereon and secured pivotally thereto by the bolt 27, being thereby generally in line with the nose portion of the bumper against which impact is usually received, the bolt 27 transmitting impact pressure in shear to the buckling column 23. Cushioning means in the form of a rubber strip or bead 31 may be applied to the outer side of the nose of the bumper in a desirable manner such as by inserting resilient snap-in button lugs 32 through openings 33 provided therefor in the bumper.

Figure 5:
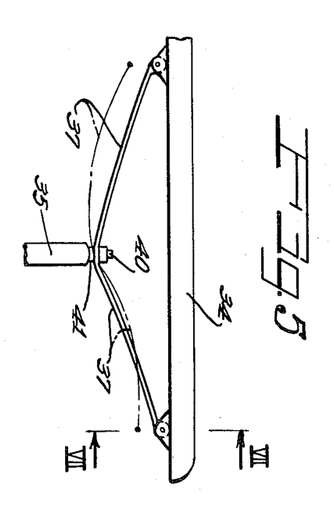
FIG. 5 is a schematic plan view of a further modification.
Figure 6:
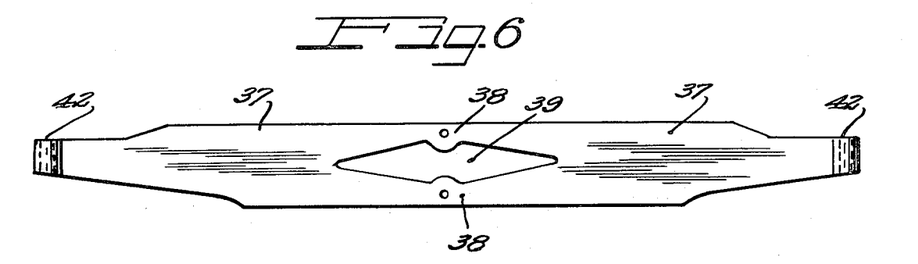
FIG. 6 is an elevational view of the buckling column structure of FIG. 5.
Figure 7:
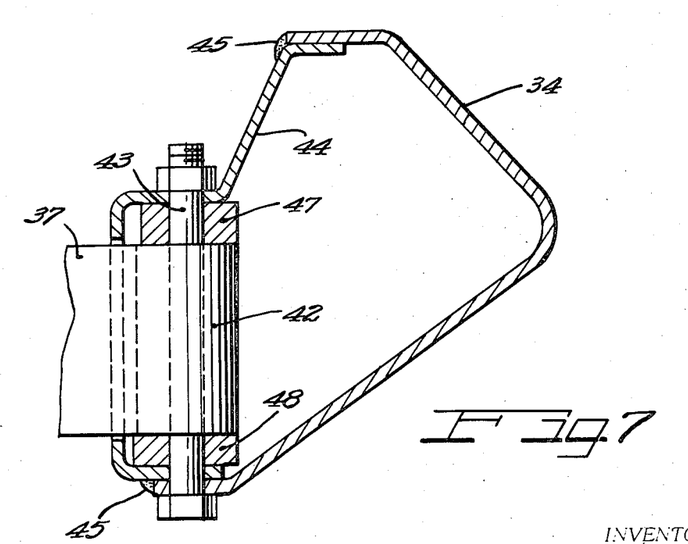
FIG. 7 is an enlarged fragmentary sectional detail view taken substantially on the line VII—VII of FIG. 5.

In FIGS. 5–7 is shown another arrangement in which a bumper 34 is supported on respective ends of vehicle frame bars 35 by intervening buckling column bars 37, desirably constructed in one piece splayed structure such that the bars extend generally diagonally forwardly from integral connecting attachment flange portions 38 separated by an intervening cutout 39 such that the proximal ends of the buckling columns 37 are furcated, while the distal end portions of the buckling columns have their side edges tapered to attain the most efficient spring buckling resistance and return capability for the intended purpose. Attachment of the flange portions 38 to the bar 35 may be by means of bolts 40 in a manner to permit at least slight pivoting, there being preferably a resilient washer 41 disposed between the attachment portions 38 and the end of the frame bar 35 in each instance. At their distal terminals, the buckling column bars 37 are provided with means for attaching the same to the bumper 34, in this instance comprising integral respective bushings 42 pivotally secured as by means of bolts 43 to a bracket 44 secured as by welding 45 to upper and lower in-turned flanges on the bumper 34, there being respective upper and lower washers 47 and 48 respectively between each attachment bearing bushing 42 and the bracket. Although the bracket 44 may be individual for each of the bearing attachment bushings 42, it may also comprise a reinforcing bar extending throughout at least the major length of the bumper 34. Although each of the buckling columns 37 may be of equal length, for some purposes, to accommodate shorter bumpers, one of the buckling columns 37 disposed nearest the adjacent end of the bumper may be shorter than the other of the buckling columns. Further, each of the buckling columns may be slightly prebent or biased to control the direction of buckling, as shown herein, the shorter of the buckling columns 37 being biased to buckle toward the bumper 34 and the other of the buckling columns 37 being biased to buckle away from the bumper during impact or pressure deflection, substantially as shown in dot-dash outline in FIG. 5.

Figures 8, 9:
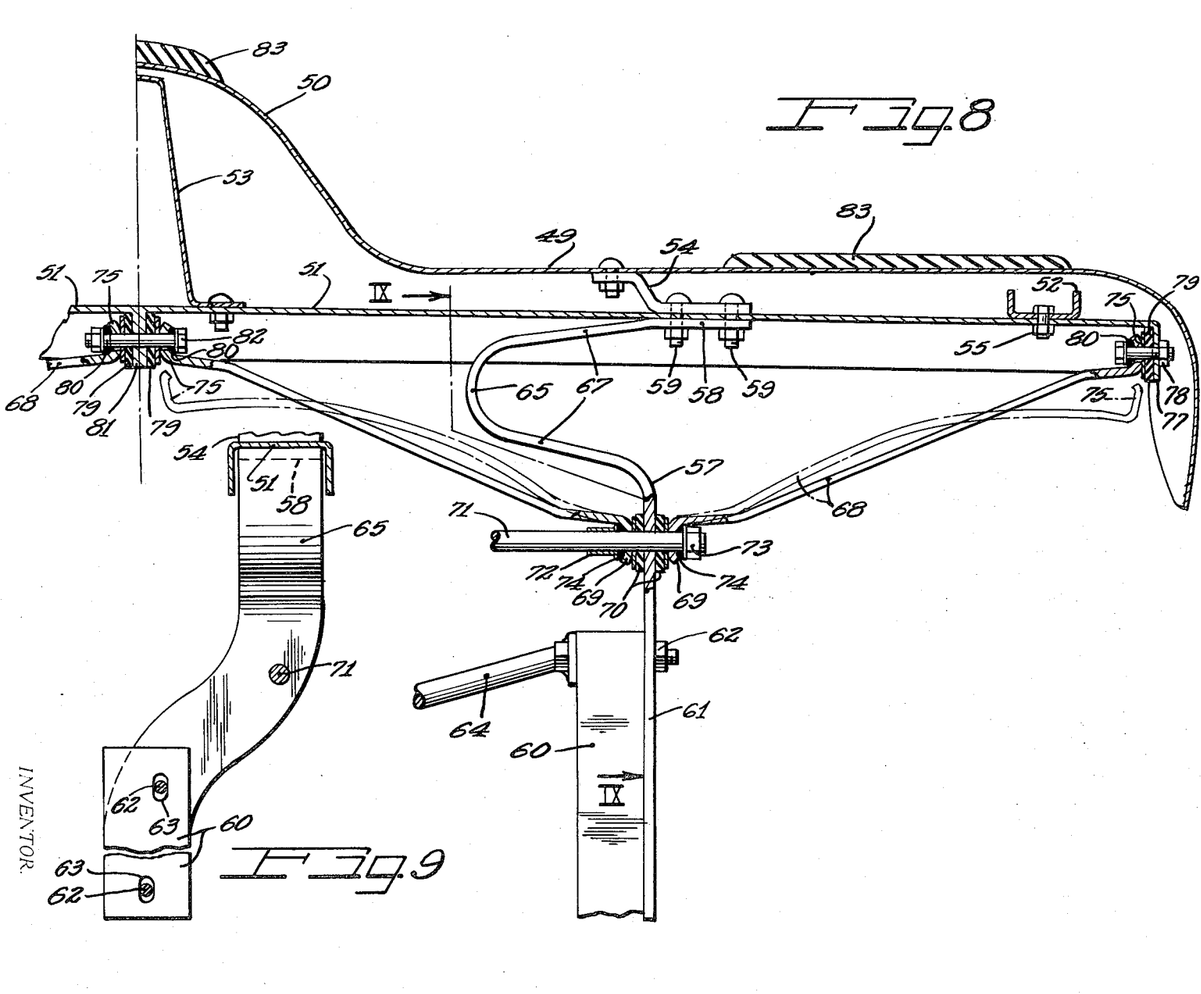
FIG. 8 is a top plan sectional view, partially in section, of still another modification embodying features of the invention.
FIG. 9 is a fragmental elevational sectional detail view taken substantially along the line IX—IX of FIG. 8.

On reference to FIGS. 8 and 9, depicting a bumper 49 having a prominent central protruding portion 50, a reinforcing bar 51 extends throughout substantially the length of the bumper 49 and may be secured thereto by means of respective brackets 52 adjacent opposite ends, a central bracket 53 and respective intermediate brackets 54. Herein, the reinforcing bar structure 51 provides part of the bumper support system and whereas the brackets 52 may be welded permanently to the bumper, and more particularly upper and lower in-turned flanges thereof and removably attached as by means of bolts 55 to the bar 51. The brackets 53 and 54 may be mounted more or less permanently on the bar 51 and the bumper secured thereto removably as by means of bolts.

Construction of the bumper support system including the bar structure 51 and bumper attaching brackets is preferably unitized so that the manufacturer can supply the systems fully assembled and ready for immediate and quick installation on the intended vehicles as original equipment or as replacements. To this end, hanger means are provided comprising a pair of allochiral hanger bars 57, one for each side of the vehicle, although only one of them is shown. On its outer end the hanger bar 57 has a terminal attachment flange 58 secured as by means of bolts 59 to the inner side of the bar 51, the same bolts desirably also securing the associated bracket 54 to the bar 51. For securing the hanger bar 57 to the vehicle, and more particularly to one of the longitudinal frame bars 60 of the vehicle, means are provided comprising an inward longitudinal extension 61 on the hanger bar adapted to be secured by means of bolts 62 which extend through transverse holes 63 in the frame bar 60. Attachment of cross brace struts 64 to and between the frame bars 60 may also be effected by means of the bolts 62. In order to accommodate difference in the desired height or elevation of the bumper 49 relative to the frame bars 60, the hanger bar 57 may be contoured vertically by ogee intermediate shape, substantially, as shown in FIG. 9, to have the attachment extension 61 thereof at the elevation of the frame bar 60 while the outer bumper-supporting terminal portion of the hanger bar is offset at the proper elevation to support the bumper at the desired elevation, in this instance at a higher elevation than the vehicle frame bars 60.

For yieldable spring support of the bumper, the hanger bar 57, in this instance, is constructed with a spring loop 65 serving not only to space the bumper supporting bar 51 from the extension portion 61, but also to yield resiliently in response to impact pressure against the bumper 49. For this purpose, the hanger bar 57 is desirably made from steel such as hot formed rerolled rail SAE 1060–1080 and with at least the spring loop portion 65 heat treated in the manner hereinbefore described for production of the buckling columns. However, because of its primary supporting function, the hanger bar 57 is desirably of a heavier gauge strip material than may be necessary for the buckling column. In an especially efficient form, the spring loop 65 is provided with generally convergently related preferably straight legs 67 joined together on the substantial radius of curvature and joined respectively on a radius of curvature to the extension portion 61 on the one hand and joined at a slight angle to the attachment terminal 58 on the other hand.

To attain a balanced energy storing/absorbing system for the bumper 49, a pair of preferably substantially identical buckling column bars 68 supplement the impact resistance and yielding function of the spring loop 65 and are attached to the hanger bar 57 inwardly adjacent to the radius junction of the portion 61 with the loop leg 67 integral therewith. For this purpose, each of the column bars 68 has a respective generally L-shaped attachment terminal flange 69 attached to thrust against the side of the hanger bar with respective thick elastomeric washers 70 interposed between the flanges 69 and the hanger bar. Although the column flanges 69 may be bolted in place, conveniently terminal portion of a tie rod 71 is utilized for the purpose and to this end has a shoulder 72 which may be an integral or welded-on collar which thrusts toward the attachment flange 69 of the buckling column at the inner side of the hanger bar with a terminal portion of the rod extending through the flanges 69 and the hanger bar 61 and has a nut 73 fitted onto its extremity portion and tightened toward the adjacent flange 69 to clamp the flange 69 and the elastomeric washer 70 firmly against the intervening hanger bar 61. Desirably elastomeric washers 74 are interposed between respectively the shoulder 72 and the nut 73 and the adjacent flanges 69 whereby to afford with the washer 70 a limited range of swivelling capability for the attachment flanges 69.

From the attachment flanges 69, the buckling column bars 68 extend in generally splayed relation laterally and toward the bar 51, having respective generally L-shaped terminal attachment flanges 75 on their opposite ends from the attachment flanges 69 and turned outwardly. One of the buckling column bars 68 has its terminal attachment flange 75 in generally opposed relation to the inner side of a generally longitudinally inwardly turned terminal flange 77 on the end of the bar 51, with attaching means such as a bolt 78 securing these flanges together in a manner to permit limited pivotal movement of the flange 75 relative to the flange 77 during buckling of the spring column, substantially as shown in dot-dash outline. The limited pivotal movement is enabled by a generally at least partially curved shape of the flange 75 in the longitudinal direction, and by an elastomeric washer 79 compressibly interposed between the flange 75 and the flange 77 and a thick elastomeric washer 80 interposed between the head of the nut 78 and the flange 75. In similar fashion, the buckling column bar 68 which extends diagonally toward the central portion of the bar 51 has its outer end terminal attachment flange 75 attached in a limited longitudinal pivotal fashion to a longitudinally inwardly directed flange 81 on the bar 51. Attachment means comprise a bolt 82, with respective elastomeric bearing washers 79 and 80 cooperating with the flange 75 similarly as already described. In this instance, for manufacturing, handling and assembly convenience, the bar 51 is split at the center with each of the sections of the bar having one of the central attachment flanges 81, and the bolt 82 secures these flanges together, as well as securing the contiguous attachment terminal flanges 75 of the buckling columns. Through this arrangement resistance to impact at the center of the bumper is provided by the generally convergently related buckling columns 68 which join the reinforcing bar 51 at the central portion of the bumper assembly, the opposite ends of the reinforcing bar structure are respectively resisted by one of the buckling columns 68 in each instance, and intermediate the two sets of buckling columns the relatively stiffer hanger bar spring 65 affords impact resistance. All of the springs function cooperatively to return the bumper 49 to its original position on being released from impact force within the range for which the energy-storing/absorbing bumper support system has been designed. Further bumper protection may be provided by mounting on the outer surface thereof, at locations most likely to be impacted, cushioning material such as elastomeric cushioning strips 83.

Figure 10:
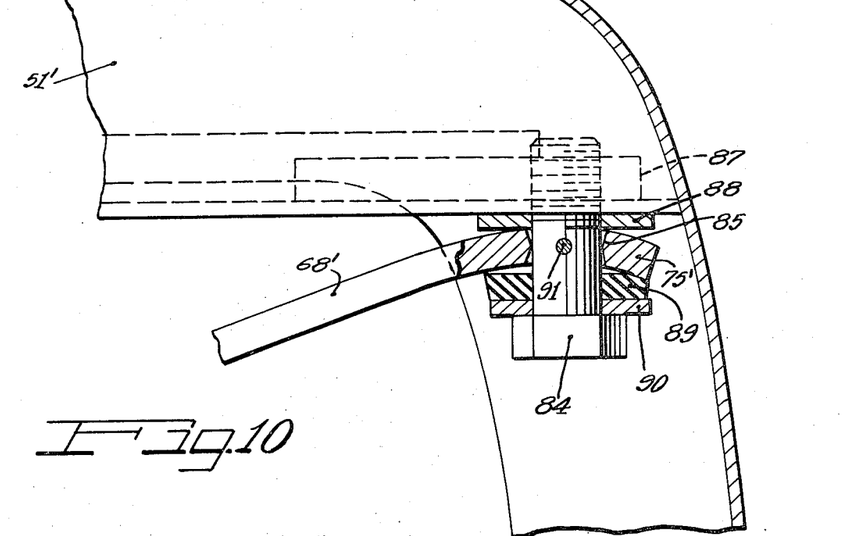
FIG. 10 is a fragmentary plan sectional detail view showing a modified buckling column attachment to the bumper.

In FIG. 10 is disclosed a modification of the construction of FIG. 8 in which the reinforcing bar 51' is fixedly attached as by welding to the inside of and in direct reinforcing engagement with the bumper 49' throughout substantially its entire length, providing a substantially box beam structure. In this instance, the spring bar buckling column 68' has an out-turned pad-like perforated attachment flange terminal 75' generally pivotally attached to the end portion of the reinforcing bar 51' by means of a bolt 84 extending through a rocking clearance hole 85 in the flange 75' and threadedly engaged in a tapped nut block 87 permanently secured to the bar 51'. Thrust of the flange 75' toward the bar 51' is against an interposed wear washer 88. Limited rocking movement of the terminal flange 75' during buckling deflections of the column 68' are facilitated by a thick elastomeric washer 89 clamped against the flange by the head of the bolt 84 and a thrust washer 90. Unintentional loosening of the bolt 84 may be prevented by a locking pin 91 extending through the shank of the bolt and the attachment flange 75'.

Figures 11, 12:
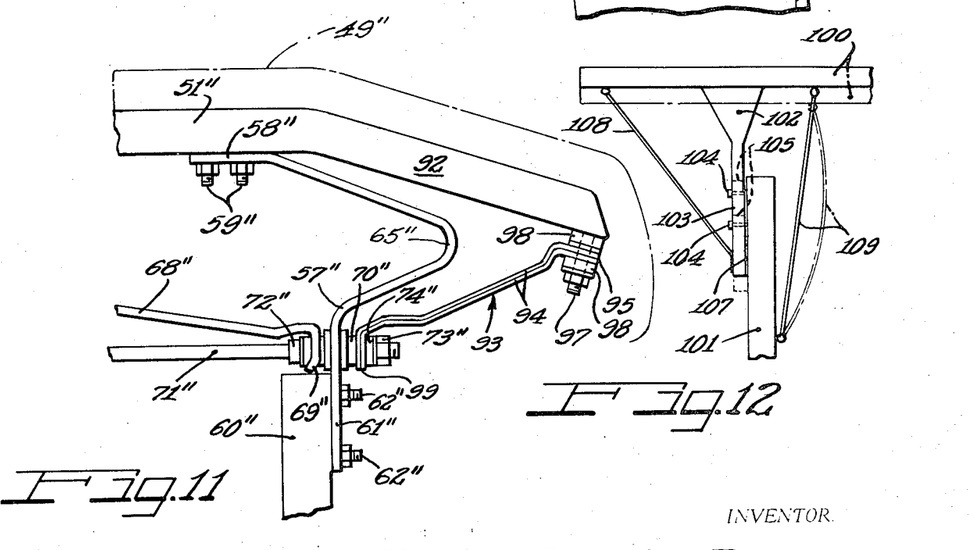
FIG. 11 is a fragmentary plan view of yet another modification.
FIG. 12 is a schematic plan view showing a bumper support embodying a combination of buckling column and frictional snubbing.

In another modified arrangement as shown in FIG. 11, especially adapted for relatively short bumper installations, the reinforcing bar or column 51'' may have its end portion 92 which extends laterally relative to the vehicle frame bar 60'' angled diagonally rearwardly, with the hanger bar 57'' disposed with its spring loop 65'' projecting in the lateral outward direction, but with the flange 58'' secured by the bolts 59'' and the inward mounting extension 61'' secured by the bolts 62'' in substantially the same manner as the similar elements in FIG. 8. While a buckling column 68'' similar to the buckling columns 68 of FIG. 8 is connected to the inner side of the portion 61'' of the hanger bar through the terminal attachment flange 69'' by means of the tie rod 71'' and the tie rod shoulder 72'', a shorter buckling column 93 is connected between the adjacent free end of the bar end portion 92 and the hanger bar. To compensate for its short length, the buckling column bar 93 is constructed as a laminar assembly of a pair of complementary coextensive bars 94 of thinner section nested together in free face contact. By their individual thinner section, the spring bar members 94 are adapted to buckle throughout a substantial deflection range without individually suffering damaging stress, and by their cooperative deflection resistance attain a spring force substantially equal to the longer one-piece buckling column 68''. Attachment of the composite buckling column spring bar 93 in a limited pivotal or rocking relation to the reinforcing bar end portion 92 is by means of an attachment terminal flange 95 and a bolt 97, respective thick elastomeric bearing washers or bushings 98 being provided at each opposite side of the attachment flange. Attachment of the buckling column 93, to the hanger bar portion 61'' is by means of a terminal attachment flange 99 secured by the nut 73'' on the adjacent end portion of the tie rod 71'', and with the elastomeric bushings 70'' and 74'' enabling limited rocking or pivotal movement of the flange 99 during buckling column deflections.

In some bumper supports it may be desirable to combine the buckling column energy storing/absorbing means with friction buffing, wherein the frictional resistance is at least sufficient to avoid snapping spring return but enabling return of the bumper by the buckling column spring action reasonably promptly following impact deflection of the bumper. An advantage of combination of friction and spring damping resides in that friction damping assures constant force resistance while the spring assures self-restoring or return function of the support system. By selection of proper geometry for the buckling column structure in association with friction buffing means a cooperative constant force resistance effect is attainable.

In one desirable arrangement embodying both buckling column and frictional resistance energy absorption in a bumper support system, as shown in FIG. 12, a bumper 100, or a reinforcing bar supporting a bumper, is supported in suitable spaced relation to the ends of longitudinal vehicle frame bars 101 (only one of which is shown) primarily by a longitudinal rigid hanger structure 102 in respect to each of the frame bars or beams 101. Attachment of the hanger to the frame bar 101 is in a manner to enable limited longitudinal reciprocal relative movement of the hanger and comprises securing a longitudinal inward extension 103 of the hanger along one side of the frame bar 101 as by means of bolts 104 which extend through longitudinally elongated clearance slots 105 in the portion 103 and clamp the same with desired pressure against a layer of friction material 107 between the confronting faces of the bar 101 and the portion 103. This friction material may be of any preferred form which is unaffected by the conditions which must be met in a bumper suspension such as resistance or insensitivity to moisture, oil, ice, dirt, unaffected by temperature variations, and remains dependable and operates reliably during at least the expected life of the associated vehicle. Materials suitable for this purpose comprise so-called wet clutch friction material which may be assembled with grease and then adequately preloaded through action of the bolts 104 supplemented, if preferred, by means of spring washers or other desirable spring preloading means associated with the bolts. Cork type material in a layer of about 1/32 inch may be employed and it may be bonded to one of the surfaces. A diagonal strut 108 may be connected between the adjacent end portion of the bumper 100 and the inner end portion of the hanger extension 103. Cooperating with the frictional buffing structure in resisting impact inward deflection of the bumper 100 is a generally longitudinally but in this instance slightly diagonally mounted buckling column bar 109 of substantial length attached pivotally at one end to the bumper 100 and attached pivotally at its opposite end to the frame bar 101 and desirably located laterally inwardly relative to the frame bar. Thus, as the bumper 100 is deflected inwardly as exemplified in dot-dash outline, the buckling column 109 buckles as shown in dot-dash outline providing deflection resistance cooperatively with the friction buffer resistance afforded by the friction surface material 107. Of course, the frictional resistance buffer will be of a controlled resistance capacity at least slightly less than the resistance capacity of the buckling column 109 so as to enable efficient return of the bumper to original position as a result of the energy stored in the buckling column 109 by an impact deflection.

Figures 13, 14, 15:
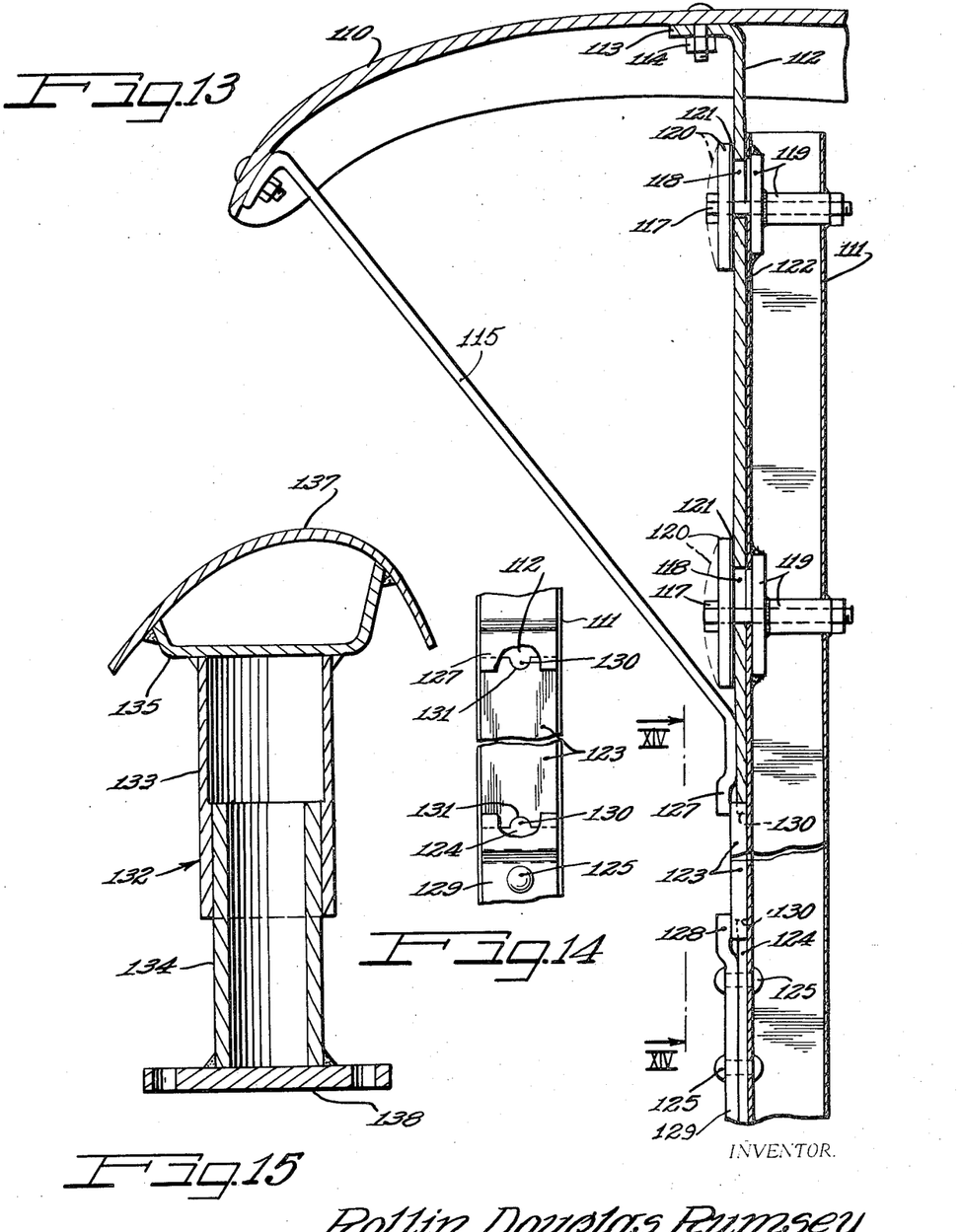
FIG. 13 is a fragmental sectional plan view illustrating another arrangement buckling column and friction buffing.
FIG. 14 is a fragmental elevational view taken in the plane of line XIV—XIV of FIG. 13.
FIG. 15 is a longitudinal sectional view through a bumper mount or hanger including a modified frictional buffing structure.
Figure 16:
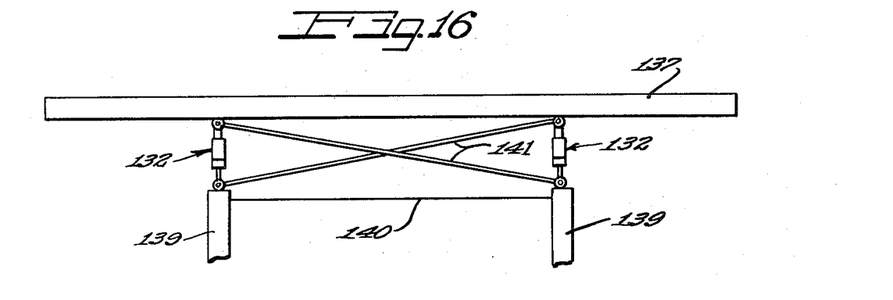
FIGS. 16 through 19 are schematic illustrations showing various additional arrangements embodying combination of buckling column and friction buffing or damping in the bumper supports.
Figure 17:
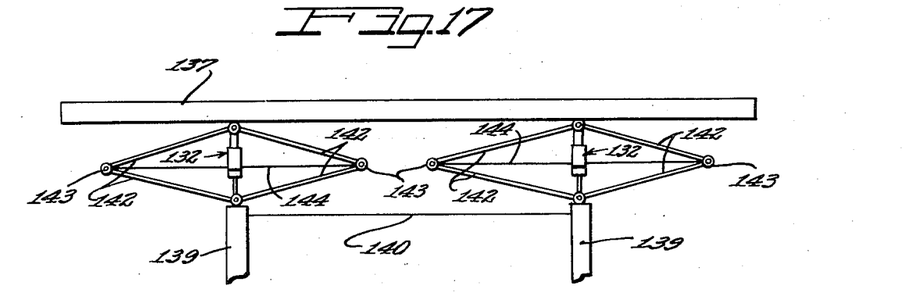
Figure 18:
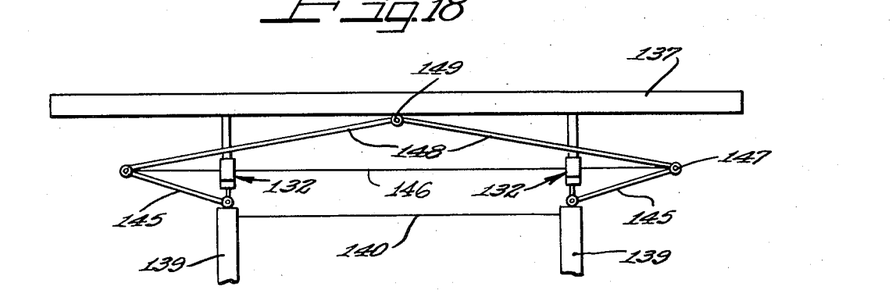

In another combination frictional resistance buffing and energy storing/absorbing buckling column arrangement as depicted in FIGS. 13 and 14, it may be necessary to mount a bumper 110 relatively substantially closer to the adjacent ends of longitudinal vehicle frame bars or beams 111 (only one of which is shown) than with an arrangement such as in FIG. 12. To this end, the bumper 110 is mounted on hangers 112 each of which comprises a flat rigid longitudinally extending bar having an outer attachment terminal flange 113 secured as by means of one or more bolts 114 to the inside of the bumper. This hanger bar is of substantial length and disposed in parallel face-to-face opposition to one side of the frame bar 111 which is desirably of box beam structure. Extending between the adjacent end portion of the bumper 110 and the inner end portion of the hanger bar 112 is a diagonal reinforcing strut 115, desirably welded to the bar 112.

For friction buffing limited relative longitudinal displacement movement of the hanger bar 112, means comprising a pair of longitudinally spaced bolts 117 are provided, with the shanks of the bolts extending through elongated respective slots 118 in the bar 112 and of a length to limit the range of longitudinal movement to that preferred or permissible for impact inward deflection of the bumper, such as from 1½ to 2½ inches, the opposite ends of the slots serving as stops. Within the beam 111, the bolt shanks are desirably projected through rigid reinforcing structure 119. For distribution of bolt pressure against the hanger bar 112, preloaded spring pressure plates 120 are drawn up against the bar 112 toward the beam 111 by the bolts 117 from a normal sprung condition as indicated in dash outline. Thereby, friction material 121 carried by the inner faces of the spring washers or plates 120 is frictionally pressed slidably against the confronting face of the bar 112, and by the compressive force exerted by the plates 120 against the bar 112 friction material 122 between and desirably bonded to one of the confronting faces of the beam 111 and the bar 112 is rendered frictionally resistive to relative longitudinal movement of the hanger bar 112 and the beam 111. Similar material may be used in the friction layers 121 and 122 as described in respective FIG. 12.

Buckling column spring resistance energy absorption and storage during impacts against the bumper 110 are effected by means of a buckling column spring bar 123 which is supported on the beam 111 in longitudinal alignment with the inner end of the hanger bar 112 and lying in parallel relation along the same face of the beam. The construction and relationship is such that inward longitudinal thrust from the hanger bar 112 is transferred endwise to the buckling column bar 123. For this purpose, the buckling column bar 123 is mounted at its inner end in endwise thrusting relation against a stop 124 which may be a metal plate secured as by means of rivets 125 to the frame beam. To hold the buckling column bar 123 in place while nevertheless permitting it to buckle deflectably with high energy storage, an overlapping retainer flange extension 127 on the inner end of the strut 115 engages with the outer end portion of the buckling column, a similar retainer flange 128 on a retainer bar 129 secured in place by the rivets 125 overlappingly engages with the inner end portion of the buckling bar, and respective interlocking tongues 130 on the engaging end portions of the bar 112 and the stop 124 fit into respective complementary endwise notches 131 in the ends of the buckling column bar.

Another form of friction buffer or snubber 132 is shown in FIG. 15, including telescopically related tubular members comprising an outer member 133 and an inner member 134 which are assembled by shrink or press fit with the interfacial surfaces suitably treated to provide a constant, uniform coefficient of friction under widely varying conditions of temperature, moisture, dryness, oiliness, and the like. A suitable coating material is polytetrafluoroethylene or chlorinated ethylene propylene, either of which is obtainable on the market under the trademark Teflon, the latter copolymer being preferred because of its higher coefficient of friction. At its distal end the tubular snubber member 133 is secured as by welding to a bracket or bumper backup bar 135 which is secured as by welding to the inner side of a bumper 137. To the distal end of the tubular snubber member 134, means comprising an attachment plate 138 may be welded for mounting the snubber unit on the end of a vehicle frame bar to which the bumper support system is to be attached. Any desired form of the strongly resilient energy storing/buckling column bar means may be employed in connection with the snubber 132, in cooperation therewith and as return or recovery means after an impact deflection of the bumper. For example, the snubber may have a resistance level equal to about eighty percent of the spring force (i.e. absorb about forty percent of the total energy on the impact stroke) in order to insure the system resetting itself.

Figure 19:
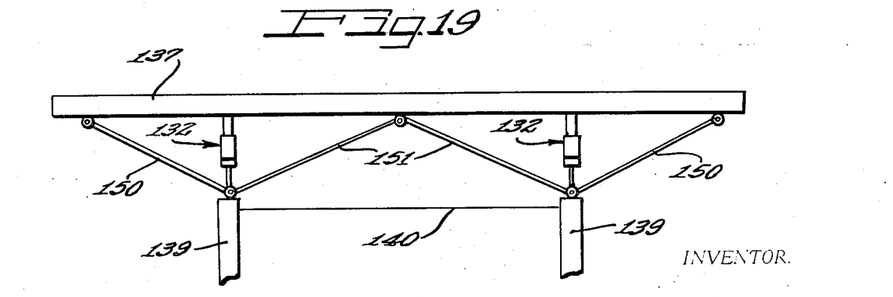

FIGS. 16–19 depict schematically examples of various combinations of the friction snubber 132 and strongly resilient buckling column bars in energy storing/absorbing bumper support systems. In each instance illustrated, the pair of snubbers 132 serves as the primary hanger and spacer means for the bumper 137 relative to the adjacent ends of longitudinal frame bars or beams 139 which may be suitably tied together as by means of reinforcing or tie bar or rod structure 140. Buckling column means in FIG. 16 comprise a pair of bar members 141 in X-crossing relation respectively pivotally connected to one of the frame bars 139 and to the bumper 137 at or adjacent to juncture of the friction buffers 132. In the scheme shown in FIG. 17 each of the friction buffers 132 has a generally quadrilateral arrangement of strongly resilient buckling column bars 142 in which a respective pair of the buckling column bars extends in triangular relation to each side of the buffer extending pivotally from respectively the bumper 137 and the frame bar 139 and converging to and joined on a pivot 143, with a tie rod 144 connecting the pivot joints 143. The FIG. 18 arrangement comprises a relatively short strongly resilient buckling column bar 145 pivotally attached to the frame bar 139 in each instance and extending laterally diagonally outwardly therefrom to the respective extremities of a tie rod 146 and pivotal juncture 147 with a respective longer strongly resilient buckling column bar 148 which extends diagonally to a separate pivot connection, or a common pivotal juncture 149 with the companion bar 148 and connecting the buckling column assembly to the bumper 137 preferably midway between the buffers 132. A zig-zag arrangement of strongly resilient buckling column bars is depicted in FIG. 19 wherein respective bars 150 extend as diagonal struts pivotally connected at their respective opposite ends to the frame bars 139 and the adjacent end portions of the bumper 137 while buckling column bars 151 extend from pivotal juncture with the bars 139 into converging relation at a pivotal juncture and connection 152 on the bumper 137, desirably midway between the buffers 132.

Figure 20:
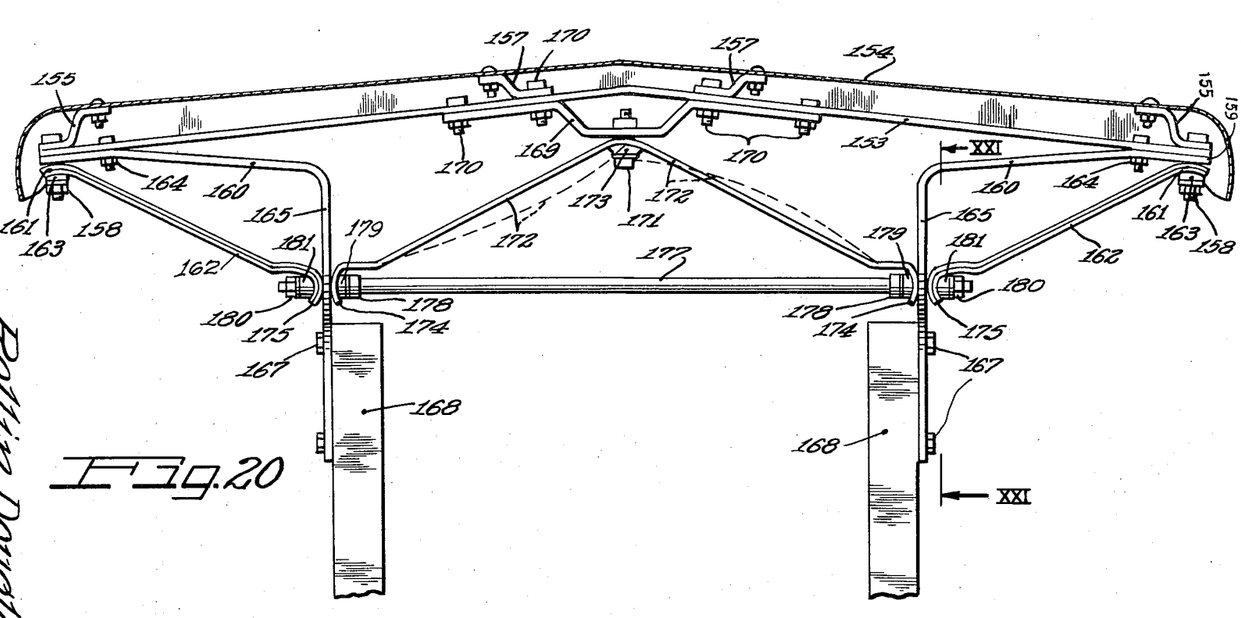
FIG. 20 is a sectional plan view of a further modification embodying buckling column impact energy storing/absorption.
Figure 21:
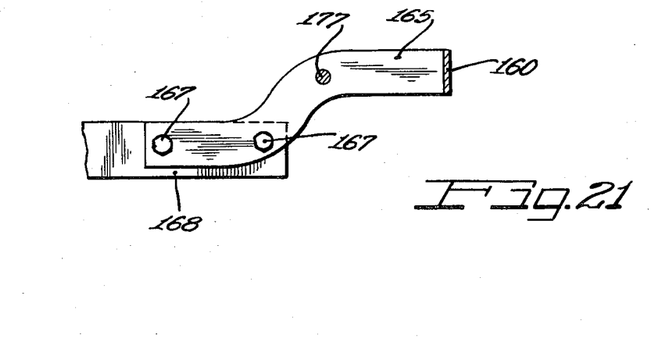
FIG. 21 is a sectional elevational view taken substantially in the plane of line XXI—XXI of FIG. 20.

Referring now to the construction of FIGS. 20 and 21, an arrangement is shown which provides for complete reuseability of the energy storing/absorbing bumper support system, i.e., every part of the system is reuseable even though any one or more of the elements may require replacement at any time. Further, this arrangement simplifies the hanger and jacking structure, affords a superior center support for the bumper, and provides for improved transfer of impact load from one part of the system to another part of the system, such as from the center toward the outside supports, and from the corners or end portions of the bumper toward the center, with full recovery capability. To this end, a spring steel bar 153 extends substantially throughout the length of and provides the means to which a bumper 154 is detachably connected as by means of angular brackets 155 bolted to the end portions of the bumper and brackets 157 bolted to the bumper equally spaced adjacent to its center. Each of the brackets 155 is detachably secured to the associated end portion of the bar 153 as by means of a bolt 158 which also serves to secure the bar to the adjacent part of the support system comprising an attachment flange 159 of a spring steel bar jacking member 160 and an arcuate rocking attachment terminal 161 of a relatively short laminar spring steel buckling column 162, with a rubber bushing 163 between the nut of the bolt and the terminal 161 to enable pivoting of the latter. Further separable attachment of the flange 159 to the bar 153 may be effected by means of one or more bolts 164 located adjacent to angular juncture of the flange with the jacking member 160 which diverges from the bar 153 sufficiently to at least enable full buckling column yieldable energy storing/absorbing function. In addition, the jacking member 160 through a longitudinally extending substantially rigidly mounted hanger bar extension 165 therefrom serves as a stop in cooperation with the bar 153 to prevent overstressing of the buckling column structure of the system. Attachment of the bumper and the energy storing/absorbing support system therefor to the associated vehicle is through the hanger bars 165 secured as by means of bolts 167 in parallel relation against respective ones of longitudinal frame bars 168.

For central buckling column support of the spring steel bar 153, an angular spring steel support bracket 169 is secured at its opposite end portions as by means of spaced bolts 170 to the inner side of the bar 153, with one of the bolts in each set also securing the respective brackets 157 to the bar 153. Centrally, the spring bracket 169 is spaced from the central portion of the bar 153 and has removably connected thereto as by means of one or more bolts 171 a generally V-shaped buckling column structure comprising a pair of integrally joined strongly resilient buckling column members 172 rockably engaged against the bracket 169 at their juncture and with rubber bushing means 173 located in the bight of the juncture. Desirably the buckling column members 172 are of the type in which one of them is adapted to buckle outwardly and the other of them is adapted to buckle inwardly, as indicated in dash outline. At their distal ends, the buckling columns 172 have curved respective attachment terminals 174 which are, similarly as curved inner end attachment terminals 175 on the buckling columns 162, rockably attached to the respective hanger bars 165 by means of a tie rod 177 which extends through the assembly and has a fixed shoulder 178 opposing the terminal 174 through an intervening elastomeric bushing 179 while a nut 180 confronts the terminal 175 through an intervening elastomeric bushing 181.

From the foregoing it will be apparent that the present invention provides an energy storing/absorbing bumper support system of great versatility enabling adaption of the system to many environmental relationships. The system is especially suitable for automobile bumper installations, requiring minimum extension from body contour, and provides an essentially all steel construction, easy design parameters for predictable results, simplicity of structure, developes constant force in response to impacts, enables reuse of parts, provides an all-weather, low cost, relatively light weight assembly compatible with current automobile design practice, is non-interfering with jacking function, and is non-aging.

While numerous specific embodiments of the invention have been disclosed, it will be appreciated that to a large extent many, if not most, of the various features may be utilized in numerous other permutations which will readily suggest themselves.

It will be understood that variations and modifications may be effected without departing from the spirit and scope of the novel concepts of this invention.

I claim as my invention:

1. In combination with an automatic vehicle frame having longitudinally extending horizontally spaced bars providing coextensive outboard end portions, a rigid elongated horizontally extending bumper in outboard spaced relation relative to said frame bar end portions, and means connecting the bumper to said frame bar end portions enabling a limited range of inboard impact displacement of the bumper relative to said frame bar ends and comprising:

respective strongly resilient energy storing buckling column metal bars having outboard ends thereof relatively fixedly connected to the bumper and inboard ends relatively fixedly connected to the frame bars;

said buckling column bars being disposed to receive endwise compressive forces from inboard impacts against the bumper and enabling said limited range of inboard displacement of the bumper accompanied by energy storing/absorbing buckling resilient loading of the bars attaining a high resistance level initially and maintaining that resistance relatively constant throughout said range of displacement and developing a return bias for the bumper when released from the force of the impact.

2. A combination according to claim 1, said displacement range being limited to from about 1½" to about 2½" maximum, and said buckling column bars being operative to maintain said relatively constant high resistance level in said range under impacts occurring up to at least five miles per hour relative velocity between the associated vehicle and an object impacting the bumper.

3. A combination according to claim 1, in which said connecting means include respective generally rigid hanger structure, means securing said hanger structure to said frame bar end portions and projecting outboard therefrom, said buckling column bars having their inboard ends secured to said hanger structure.

4. A combination according to claim 3, including a tie bar extending between and secured to said hanger structures.

5. A combination according to claim 1, including hanger structures secured to and between said bumper and said frame bar end portions and yieldable relative to the frame bar end portions upon inmpact displacement of the bumper relative to the frame, said buckling column bars having their inboard ends connected directly to the frame bar end portions.

6. An energy storing/absorbing system for supporting a bumper deflectably on and relative to a structure and comprising:

a plurality of strongly resilient buckling column bars; and means for connecting said bars relatively fixedly to and between the bumper and the supporting structure to receive impact force by endwise column loading and to enable a range of impact deflection of the bumper toward said structure accompanied by energy storing and absorbing resilient buckling of said bars attaining a high resistance level initially and maintaining that resistance relatively constant throughout said range of impact deflection of the bumper toward said structure and developing a return bias for the bumper;
said buckling column bars being disposed in splayed pairs;
said connecting means enabling pivoting of end portions of the bars;
said pairs of bars being integrally joined.

7. An energy storing/absorbing system for supporting a bumper deflectably on and relative to a structure and comprising:
a plurality of strongly resilient buckling column bars;
means for connecting said bars relatively fixedly to and between the bumper and the supporting structure to receive impact force by endwise column loading and to enable a range of impact deflection of the bumper toward said structure accompanied by energy storing and absorbing resilient buckling of said bars attaining a high resistance level initially and maintaining that resistance relatively constant throughout said range of impact deflection of the bumper toward said structure and developing a return bias for the bumper;
said buckling column bars being disposed in splayed pairs;
said connecting means enabling pivoting of the ends of the bars;
said splayed pairs of bars having converging end portions integrally joined and the respective end portions furcated; and
means at juncture of the furcated ends for securing the bars pivotally relative to the supporting structure.

8. An energy storing/absorbing system for supporting a bumper deflectably on and relative to a structure and comprising:
a plurality of strongly resilient buckling column bars; and
means for connecting said bars relatively fixedly to and between the bumper and the supporting structure to receive impact force by endwise column loading and to enable a range of impact deflection of the bumper toward said structure accompanied by energy storing and absorbing resilient buckling of said bars attaining a high resistance level initially and maintaining that resistance relatively constant throughout said range of impact deflection of the bumper toward said structure and developing a return bias for the bumper;
said bars being flat and of substantial width, comprising spring-tempered steel, and having their edges sinusoidally shaped to improve the buckling spring action of the bars.

9. An energy storing/absorbing system supporting bumper means on and normally spaced outwardly from relatively rigid structure at opposite side portions of an end of an automotive vehicle, comprising:
a plurality of strongly resilient buckling column bars extending in balanced bumper-supporting relation between said relatively rigid end structure at said vehicle opposite side portions;
said bars being constructed of a non-elastomeric material having a relatively high modulus of elasticity, and a relatively high yield point, both in the order of heat-treated steel, and having a high force to short travel distance in the buckling mode related to the weight of the vehicle such that impact of in the order of 5 m.p.h. against the bumper means can be tolerated without damage to the bumper means or the vehicle in a short displacement travel distance of the bumper means toward said rigid end structure, which distance is severely restricted by vehicle design and available space limitations between a normal position of the bumper means and said end structure and means attaching said bars relatively fixedly at their respective opposite ends to said bumper means and to said vehicle end structure, whereby the bars will receive endwise compressive forces which result from impacts tending to move the bumper means and vehicle end structure toward one another, thereby enabling said short travel distance impact displacement of the bumper means accompanied by energy storing/absorbing buckling resilient loading of said bars attaining a high resistance level initially and maintaining that resistance level relatively constant throughout said short displacement travel distance, and developing a resilient return bias for the bumper means to return it toward said normal position upon release from the force of any such impact.

10. A system according to claim 9, said buckling column bars being disposed in splayed pairs, and said connecting means enabling pivoting of end portions of the bars.

11. A system according to claim 10, said splayed pairs of bars being prearranged to buckle in respectively opposite directions.

12. A system according to claim 9, said bars being disposed in a generally zig-zag orientation between the bumper means and the supporting structure.

13. A system according to claim 9, said bars being oriented in generally X-crossing relation.

14. A system according to claim 9, said bars being connected in a quadrilateral geometric relation, and having a tie member extending between certain ends of the bars.

15. A system according to claim 9, said bars being connected together by convergent pairs, and a tie rod connecting pairs of the bars together at their convergences.

16. A system according to claim 9, said connecting means including means attaching end portions of the bars, and elastomeric means cooperate with said attaching means and said end portions to facilitate pivoting of said end portions.

17. A system according to claim 9, said bars being disposed in diagonal orientation relative to the bumper means and said end structure.

18. A system according to claim 9, said bars being located in a longitudinal orientation relative to deflectabilities of the bumper, and means for imparting the endwise buckling force from the bumper means to said bars during said impact deflection of the bumper means.

19. A system according to claim 9, said bars serving as hanger means between the bumper means and the supporting structure.

20. A system according to claim 9 including hanger means comprising part of said connecting means and said bars being connected between the bumper means and the supporting structure through said hanger means.

21. A system according to claim 20, said hanger means comprising spring bar structure providing return spring bias supplemental to the buckling loading of said buckling column bars.

22. A system according to claim 9 including hanger means providing friction buffing supplementing the energy absorbing function of said buckling column bars and modulating return bias action of the buckled loaded bars.

23. A system according to claim 9, at least certain of said buckling column bars comprising a laminar assembly of freely engaging coextensive bar members coactive in the buckling actions of the bars.

24. A system according to claim 9, said bar means comprising a plurality of buckling column bars disposed obliquely between said bumper means and said structure.

25. A system according to claim 9, in which said buckling column bars have their axes substantially straight-on between said bumper means and said structure.

26. A system according to claim 9 in which said bumper means is an elongated member disposed horizontally and has opposite end portions, certain of said buckling column bars connected to the respective opposite end portions of the bumper member, and additional of the bars connected to the bumper member intermediate said end portions, all of the bars functioning cooperatively to return the bumper means to its original position on being released from impact force within the range for which the system has been designed.

27. A system according to claim 9, in which said bumper means comprises a contoured profile member, and reinforcing bar means extending along substantially the length of the profiled member and secured thereto, said buckling column bars being connected to said reinforcing bar means.

28. A system according to claim 9, said attaching means comprising resilient jacking portions secured to said bumper means and respective rigid hanger portions extending therefrom and having means for securing them fixedly to said structure, said buckling column bars extending diagonally between said hanger portions and said bumper means.

29. A system according to claim 9, said attaching means comprising a pair of hangers and reinforcing bar structure extending along said bumper means and having said hangers attached thereto on opposite end portions of the reinforcing bar structure, said buckling column bars extending from said hangers and attached to said reinforcing bar structure, and a tie rod secured to and extending between said hangers.

30. A system according to claim 29, each of said hangers having a spring portion between said tie rod and said reinforcing bar structure.

31. An energy storing/absorbing system supporting bumper means on and normally spaced outwardly from relatively rigid structure at opposite side portions of an end of an automotive vehicle, comprising:
a plurality of strongly resilient buckling column bars extending in balanced bumper-supporting relation between said relatively rigid end structure at said vehicle opposite side portions;
said bars being constructed of a non-elastomeric material having a relatively high modulus of elasticity, and a relatively high yield point, both in the order of heat-treated steel, and having a high force to short travel distance in the buckling mode related to the weight of the vehicle such that impact of in the order of 5 m.p.h. against the bumper means can be tolerated without damage to the bumper means or the vehicle in a short displacement travel distance of the bumper means toward said rigid end structure, which distance is severely restricted by vehicle design and available space limitations between a normal position of the bumper means and said end structure; and
means attaching said bars relatively fixedly at their respective opposite ends to said bumper means and to said vehicle end structure, whereby the bars will receive endwise compressive forces which result from impacts tending to move the bumper means and vehicle end structure toward one another, thereby enabling said short travel distance impact displacement of the bumper means accompanied by energy storing/absorbing buckling resilient loading of said bars attaining a high resistance level initially and maintaining that resistance level relatively constant throughout said short displacement travel distance, and developing a resilient return bias for the bumper means to return it toward said normal position upon release from the force of any such impact;
said attaching means including hanger means for the bumper means, said hanger means being at least in part resiliently yieldable and including a part for fixedly mounting the hanger means on said rigid structure to maintain the bumper means against vertical displacement relative to said rigid structure.

32. A system according to claim 1, said bars having end attachment flanges, and means rockably connecting said attachment flanges to respectively the hanger means and the bumper means.

33. An energy storing/absorbing system supporting bumper means on and normally spaced outwardly from relatively rigid structure at opposite side portions of an end of an automotive vehicle, comprising:
a plurality of strongly resilient buckling column bars extending in balanced bumper-supporting relation between said relatively rigid end structure at said vehicle opposite side portions;
said bars being constructed of a non-elastomeric material having a relatively high modulus of elasticity, and a relatively high yield point, both in the order of heat-treated steel, and having a high force to short travel distance in the buckling mode related to the weight of the vehicle such that impact of in the order of 5 m.p.h. against the bumper means can be tolerated without damage to the bumper means or the vehicle in a short displacement travel distance of the bumper means toward said rigid end structure, which distance is severely restricted by vehicle design and available space limitations between a normal position of the bumper means and said end structure;
means attaching said bars relatively fixedly at their respective opposite ends to said bumper means and to said vehicle end structure, whereby the bars will receive endwise compressive forces which result from impacts tending to move the bumper means and vehicle end structure toward one another, thereby enabling said short travel distance impact displacement of the bumper means accompanied by energy storing/absorbing buckling resilient loading of said bars attaining a high resistance level initially and maintaining that resistance level relatively constant throughout said short displacement travel distance, and developing a resilient return bias for the bumper means to return it toward said normal position upon release from the force of any such impact; and
hanger means connected to and between the bumper means and said rigid structure to maintain the bumper means against vertical displacement relative to said rigid structure, said hanger means being at least in part yieldably movable relative to said rigid structure responsive to impact displacement of the bumper means toward said structure.

34. A system according to claim 33, said hanger means including respective portions reciprocably mounted on said rigid structure, means connecting said portions to the rigid structure and enabling relative reciprocation of said portions and said rigid structure, said buckling column bars being longitudinally aligned with said portions along said rigid structure with one of their ends in thrusting relation to said hanger portions, and respective stops on said rigid structure engaged by the opposite ends of said bars.

35. A system according to claim 34, including friction means acting with said hanger portions to effect friction buffing in the reciprocations of said portions relative to said rigid structure.

36. A system according to claim 33, said hanger means and said rigid structure having relatively reciprocably related surfaces, and friction material between said surfaces and resisting relative reciprocations between said surfaces.

37. A system according to claim 33, said bumper means comprising a horizontal automobile bumper, said rigid means comprising horizontally spaced automobile frame beams extending outwardly on said vehicle end, respective friction buffers operatively connected to said bumper and to the outer ends of said frame beams, said buckling column bars having end portions connected to respectively said beams and said bumper.

38. An energy storing/absorbing system supporting bpmper means on and normally spaced outwardly from relatively rigid structure at opposite side portions of an end of an automotive vehicle, comprising:

a plurality of strongly resilient buckling column bars extending in balanced bumper-supporting relation bebetween said relatively rigid end structure at said vehicle opposite side portions;

said bars being constructed of a non-elastomeric material having a relatively high modulus of elasticity, and a relatively high yield point, both in the order of heat-treated steel, and having a high force to short travel distance in the buckling mode related to the weight of the vehicle such that impact of in the order of 5 m.p.h. against the bumper means can be tolerated without damage to the bumper means or the vehicle in a short displacement travel distance of the bumper means toward said rigid end structure, which distance is severely restricted by vehicle design and available space limitations between a normal position of the bumper means and said end structure;

means attaching said bars relatively fixedly at their respective opposite ends to said bumper means and to said vehicle end structure, whereby the bars will receive endwise compressive forces which result from impacts tending to move the bumper means and vehicle end structure toward one another, thereby enabling said short travel distance impact displacement of the bumper means accompanied by energy storing/absorbing buckling resilient loading of said bars attaining a high resistance level initially and maintaining that resistance level relatively constant throughout said short displacement travel distance, and developing a resilient return bias for the bumper means to return it toward said normal position upon release from the force of any such impact; and respective bar members secured to and between the bumper means and said rigid structure at said opposite side portions and portions of said bar members extending inwardly therefrom, said bar member portions being provided with means for connection with said rigid structures whereby to maintain the bumper means against vertical displacement relative to said rigid structure, said bar members being inwardly yieldable to enable said impact displacement of the bumper means.

39. A system according to claim 38, including means fixedly securing inboard ends of the buckling column bars to said bar member portions.

40. A system according to claim 38, including a connecting bar secured to and between said bar member portions and comprising means connecting inboard ends of the buckling column bars to said bar member portions.

41. A system according to claim 38, including stop means for limiting impact displacement of the bumper means.

42. A method of storing and absorbing potentially damaging impact force against bumper means spaced outwardly from relatively rigid structure at opposite side portions of end end of an automotive vehicle, and wherein the spaced relation is severely restricted by vehicle design and available space limitations with respect to a normal position of the bumper means and said end structure, comprising:

providing a plurality of strongly resilient buckling column bars constructed of a non-elastomeric material having a relatively high modulus of elasticity, and a relatively high yield point, both in the order of heat-treated steel, and having a high force to short travel distance in the buckling mode related to the weight of the vehicle such that impact of in the order of 5 m.p.h. against the bumper means can be tolerated without damage to the bumper means or the vehicle in the short distance for displacement travel provided by said spaced relation of the bumper means to said rigid structure;

attaching said bars relatively fixedly at their respective opposite ends to said bumper means and to said vehicle end structure;

storing and absorbing the energy of potentially damaging impact force against the bumper means, including moving the bumper means from said normal position toward said end structure and thereby imposing endwise compression onto and resiliently buckling said buckling column bars and effecting a high resistance level initially and maintaining that resistance level relatively constant throughout the available travel distance in said space;

by said storing of the energy of said impact force in said buckling column bars resiliently loading said bars and developing a return bias for the bumper means; and after the impact force ceases releasing said return bias in the buckling column bars to return the bumper means toward said normal position.

43. A method according to claim 42, comprising restraining rebound of the bumper responsive to said return bias.

44. A method according to claim 42, including limiting displacement of the bumper means toward said end structure.

References Cited

UNITED STATES PATENTS

| | | | |
|---|---|---|---|
| 1,365,593 | 1/1921 | Kraus et al. | 293—91 |
| 1,375,834 | 4/1921 | Dyer | 293—100 |
| 1,474,974 | 11/1923 | Longnecker | 293—87 |
| 1,539,176 | 5/1925 | Fry | 293—91 |
| 1,581,282 | 4/1926 | Muller | 293—89 |
| 1,689,076 | 10/1928 | McCloud | 293—94 |
| 2,031,349 | 2/1936 | Williams | 293—89 |
| 2,213,592 | 9/1940 | Reyburn | 293—55 |
| 2,270,533 | 1/1942 | Knutte | 293—55 |
| 2,772,086 | 11/1956 | Foster | 267—158 |
| 3,172,268 | 3/1965 | Gensheimer | 61—48 |
| 3,459,004 | 8/1969 | Morini | 61—48 |
| 3,468,432 | 9/1969 | Baillie | 213—37 |

GERALD M. FORLENZA, Primary Examiner

R. SAIFER, Assistant Examiner

U.S. Cl. X.R.

293—99; 267—139